(12) United States Patent
Sugita et al.

(10) Patent No.: US 6,931,649 B2
(45) Date of Patent: Aug. 16, 2005

(54) OPEN AND CLOSE MECHANISM FOR RECORDING MEDIUM INSERTION PATH

(75) Inventors: Koji Sugita, Saitama (JP); Masakazu Sawahata, Saitama (JP)

(73) Assignee: Pioneer Corporation, Tokyo (JP)

( * ) Notice: Subject to any disclaimer, the term of this patent is extended or adjusted under 35 U.S.C. 154(b) by 137 days.

(21) Appl. No.: 10/072,915

(22) Filed: Feb. 12, 2002

(65) Prior Publication Data

US 2002/0118626 A1 Aug. 29, 2002

(30) Foreign Application Priority Data

Feb. 28, 2001 (JP) ........................................ 2001-055160

(51) Int. Cl.⁷ .............................................. G11B 33/02
(52) U.S. Cl. ..................................................... 720/647
(58) Field of Search .......................... 360/69; 720/647; 369/75.1, 75.2, 77.1, 77.2

(56) References Cited

U.S. PATENT DOCUMENTS

| | | | | |
|---|---|---|---|---|
| 1,288,665 A | * | 12/1918 | Page ............................ | 312/110 |
| 3,794,401 A | * | 2/1974 | Dean et al. .................. | 312/323 |
| 4,680,654 A | * | 7/1987 | Shibuya ....................... | 360/96.5 |
| 5,243,478 A | * | 9/1993 | Kawakami et al. ......... | 242/338.4 |
| 5,383,072 A | * | 1/1995 | Lee ............................. | 360/96.5 |
| 5,408,459 A | * | 4/1995 | Kawaguchi et al. ........ | 369/77.2 |
| 5,481,520 A | * | 1/1996 | Tokoro ........................ | 369/77.2 |
| 5,537,378 A | * | 7/1996 | Uehara et al. .............. | 369/77.2 |
| 5,671,102 A | * | 9/1997 | Lee ............................. | 360/96.5 |
| 5,689,490 A | * | 11/1997 | Pollard ....................... | 369/77.2 |
| 5,732,057 A | * | 3/1998 | Okabe et al. ............... | 369/75.1 |
| 5,940,245 A | * | 8/1999 | Sasaki et al. .............. | 360/99.06 |
| 6,404,720 B1 | * | 6/2002 | Inoue ......................... | 720/647 |
| 6,421,310 B1 | * | 7/2002 | Sujino ........................ | 369/75.1 |
| 6,618,339 B2 | * | 9/2003 | Sugita et al. ............... | 369/75.1 |
| 6,690,528 B1 | * | 2/2004 | Kusumi et al. ............. | 360/69 |

FOREIGN PATENT DOCUMENTS

| | | | | |
|---|---|---|---|---|
| EP | 0 307 917 A1 | | 3/1989 | |
| EP | 0 478 791 A1 | | 4/1992 | |
| JP | 61236089 A | * | 10/1986 | ........... G11B/33/02 |
| JP | 63200386 A | * | 8/1988 | ........... G11B/33/02 |

* cited by examiner

Primary Examiner—Craig A. Renner
Assistant Examiner—Christopher R. Magee
(74) Attorney, Agent, or Firm—Sughrue Mion, PLLC

(57) ABSTRACT

For preventing miss-inserting recording medium except in conditions of inserting and ejecting a recording medium, an open and close mechanism 1 for a recording medium insertion path is provided with an open and close door 13, a door gear and a locking cam 16. The open and close door 13 can rotate about the center of a pivot shaft 20 and can open and close the recording medium insertion path. The door gear rotates interlocking with the open and close door 13. The door gear is energized for closing the open and close door 13 of the recording medium insertion path. The locking cam 16 is disposed coaxially with the door gear. The locking cam 16 is formed with a convex portion 30. The pivot shaft 20 is provided with a concave portion formed concavely on an outer surface of the pivot shaft 20. When the open and close door closes the recording medium insertion path, the convex portion 30 goes into the concave portion 31 inside and opening the open and close door 13 is prevented.

8 Claims, 6 Drawing Sheets

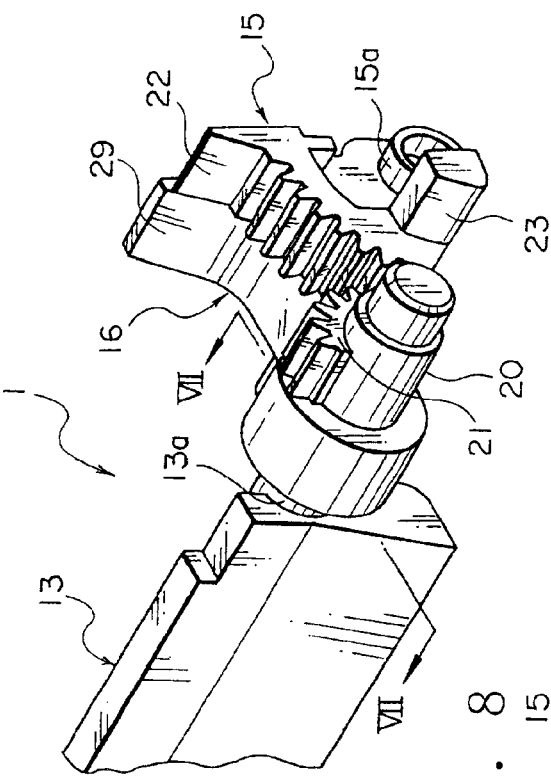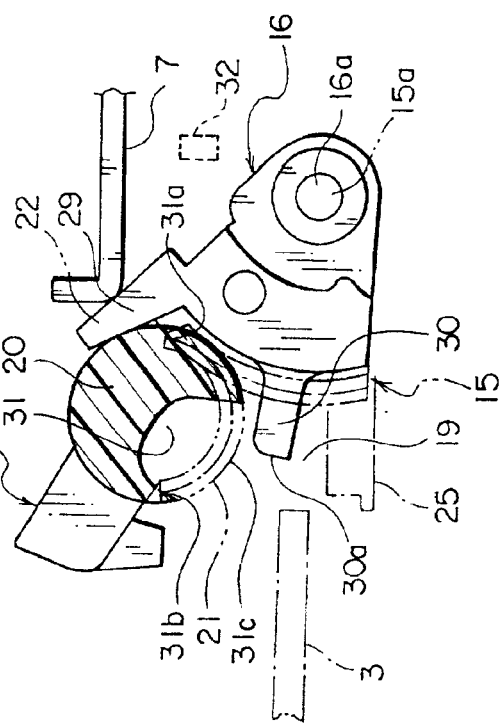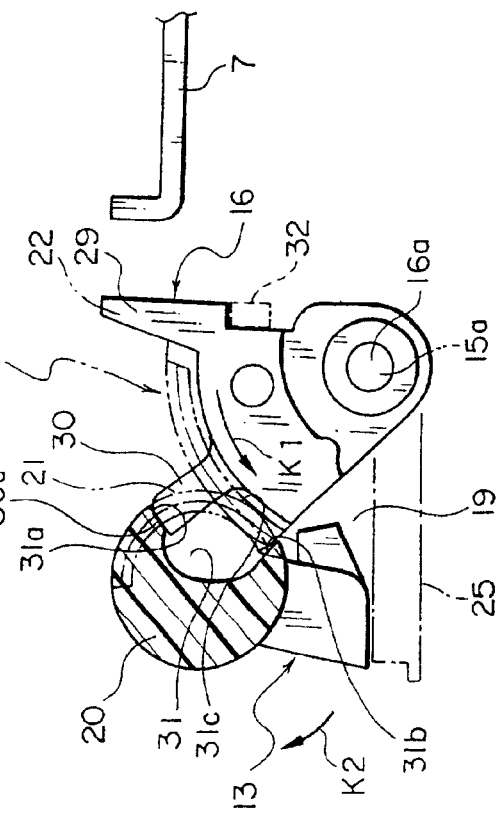

OPEN AND CLOSE MECHANISM FOR RECORDING MEDIUM INSERTION PATH

BACKGROUND OF THE INVENTION

1. Field of the Invention

This invention relates to an open and close mechanism for a recording medium insertion path, capable to put a recording medium in and out a mechanical body of a record playback device such as a CD player or a CD changer.

2. Description of the Related Art

In a car, there are installed various kind of car audio devices, record playback devices, such as a Compact Disk (CD is a short form used after this) player or a CD changer. The CD changer, mentioned above, stores a plurality of CDs as recording medium and plays back recorded information on a selected CD by a car driver's request. And the playback information on the CD is outputted as a sound with a speaker of the car audio device.

The CD player or the CD changer is provided with a recording medium insertion path, capable to put a plurality of CDs in and out. The recording medium path has a door capable to open and close for preventing dust coming into the CD changer inside.

Some of the CD players or the CD changers have an open and close mechanism which inserts the CD into a mechanical body while the open and close door is opened by a car driver pushing with the CD. Some of the CD players or the CD changers have an open and close mechanism 101 (shown in FIG. 10–13) to open the recording medium insertion path for allowing inserting the CD only when a car driver operates a switch.

The open and close mechanism 101 of the CD players or the CD changers, which opens the recording medium insertion path 119 (shown in FIGS. 12 and 13) only when the switch is operated, is provided with a door 113 capable to open and close the recording medium insertion path 119, a gear 115 and a driving member 107 mounted in the mechanical body, as shown in FIG. 10–13.

The door 113 is formed into band shape and is bore capably to rotate about a center of an end portion 113a of a direction of width. The door rotates about the center of the end portion 113a so as to open and close the recording medium insertion path 119. The door 113 is integrally formed with a gear 121 on the end portion 113a, as shown in FIGS. 10 and 11.

The gear 115 is provided capably to rotate. The gear 115 meshes with the gear 121. The door 113 and the gear 115 are energized to a direction of closing the recording medium insertion path 119. The door 113 and the gear 115 close the recording medium insertion path 119 when a driving member 107 does not abut on the door, as shown in FIGS. 10 and 12.

The driving member 107 is provided in the mechanical body capably to slide for projecting from the mechanical body and receiving into the mechanical body inside. The driving member 107 abuts on the gear 115 when projecting from the mechanical body and rotates the gear 115 to a direction for opening the door 113 of the recording medium insertion path 119, as shown in FIGS. 11 and 13.

In the open and close mechanism 101 by prior art, according to above-mentioned structure, the driving member 107 moves to project from the mechanical body by operating the switch and rotates the gear 115 so that the door 113 opens the recording medium insertion path 119. After that, a car driver can put out the CD 103 received in the mechanical body or put the CD 103 into the mechanical body.

Objects to be Solved

In the above-mentioned open and close mechanism 101 by prior art, the door 113 is energized only to a direction for closing the recording medium insertion path 119. Therefore, a richly experienced car driver in a CD changer to insert a CD 103 by pushing and opening the door 113 may insert the CD 103 into the mechanical body by forcing the door 113 open with the CD 103. Inserting a CD 103 into the mechanical body by forcing the door 113 open, the CD 103 may be inserted into the mechanical body in a disabled condition to receive a CD 103.

Thus, in the open and close mechanism 101 by prior art, it is feared that the recording medium insertion path 119 is forced open by a car driver and a recording medium such as a CD 103 may be inserted by mistake, except in conditions of receiving and ejecting a CD 103.

Therefore, objects of the invention are to provide an open and close mechanism for a recording medium insertion path which prevent to insert a recording medium into a mechanical body by mistake, except in conditions of a record playback device receiving and ejecting a recording medium.

SUMMARY OF THE INVENTION

How to Attain the Object

In order to attain the objects, according to an aspect of the invention, there is provided an open and close mechanism for a recording medium insertion path for opening and closing a transporting path of a recording medium which is inserted into a mechanical body of a record playback device and ejected from the mechanical body, and including a recording medium insertion path allowable to pass the recording medium therethrough; a open and close device for opening and closing the recording medium insertion path; and a locking device for locking open and close operation of the open and close device when the open and close device closes the recording medium insertion path.

According to another aspect of the invention, there is provided an open and close mechanism for a recording medium insertion path, which comprises an open and close mechanism for a recording medium insertion path as referred to above, including a driving device for operating said open and close device to open the recording medium insertion path, and the driving device installed in the mechanical body, wherein said locking device releases a locking condition of the open and close device when the driving device operates the open and close device to open the recording medium insertion path.

According to yet another aspect of the invention, there is provided an open and close mechanism for a recording medium insertion path, which comprises an open and close mechanism for a recording medium insertion path as referred to above, having the open and close device which includes an open and close door provided rotatably about a center of a pivot shaft extending along a width direction of the recording medium insertion path and rotating about the center of said pivot shaft for opening and closing the recording medium insertion path; a door gear rotating together with the open and close door operation of opening and closing the recording medium insertion path; and an energizing device for energizing the door gear to a direction for closing the open and close door recording insertion path, wherein the door gear is rotated by the driving device so that the open and close door opens the recording medium insertion path, wherein the locking device locks the open and close door rotating about the center of the pivot shaft when closing the recording medium insertion path and allows the open and close door rotating about the center of the pivot shaft when the driving device rotating the door gear.

According to a further aspect of the invention, an open and close mechanism for a recording medium insertion path, which comprises an open and close mechanism for a recording medium insertion path as referred to above, having the locking device which includes a cam member being rotated together with the door gear by the driving device when the driving device rotates the door gear; a convex portion projecting toward the pivot shaft from the cam member; and a concave portion formed concavely on an outer surface of the pivot shaft, wherein the convex portion goes into the concave portion to lock the open and close door rotating about the center of the pivot shaft when the open and close door closing the recording medium insertion path, wherein the cam member rotates together with the door gear so that the convex portion moves in the concave portion and goes out the concave portion to allow the open and close door rotating about the center of the pivot shaft when the door gear is rotated by the driving device.

According to the invention, the locking device locks an action for the open and close device opening the recording medium insertion path when the open and close device closes the recording medium insertion path. Then, inserting a recording medium into the mechanical body can be prevented when the open and close device closes the recording medium insertion path.

According to the invention, lock by the locking device is released when the driving device works the open and close device to open the recording medium insertion path. Then, the recording medium insertion path can be opened securely when the driving device works the open and close device to open the recording medium insertion path.

Except in a condition of the driving device working the open and close device to open the recording medium insertion path, the locking device locks an action of the open and close device opening the recording medium insertion path. Therefore, inserting a recording medium into the mechanical body can be prevented when the open and close device closes the recording medium insertion path.

According to the invention, the locking device allows the open and close door rotating when the driving device rotates the door gear. Therefore, the recording medium insertion path can be opened securely when the driving device works the open and close device to open the recording medium insertion path.

The locking device locks the open and close door rotating on the center of the pivot shaft when the recording medium insertion path is closed. Therefore, except in a condition of the driving device working the open and close device to open the recording medium insertion path, the locking device locks an action of the open and close device path the recording medium insertion path. Then, inserting a recording medium into the mechanical body can be prevented when the open and close device closes the recording medium insertion path.

According to the invention, the convex portion projecting from the cam member goes into the concave portion of the pivot shaft when the open and close door closes the recording medium insertion path. Thereby, the pivot shaft rotating action is locked and the open and close door opening the recording medium insertion path is locked. Therefore, except in a condition of the driving device working the open and close device to open the recording medium insertion path, the locking device locks securely an action of the open and close device opening the recording medium insertion opening. Then, inserting a recording medium into the mechanical body can be prevented when the open and close device closes the recording medium insertion path.

The cam member rotates together with the door gear when the door gear is rotated by mean of the driving device. And the convex portion goes through an inside of the concave portion to a direction for going out the concave portion. Therefore, the open and close door can rotate when the driving device rotates the door gear. Then, the recording medium insertion path can be opened securely when the driving device works the open and close device to open the recording medium insertion path.

The above and other objects and features of this invention will become more apparent from the following description taken in conjunction with the accompanying drawings.

BRIEF DESCRIPTION OF THE DRAWINGS

FIG. 6 is a perspective view, showing an expanded VI area shown in FIG. 5;

FIG. 7 is a sectional view taking along the line VII—VII line in FIG. 6;

FIG. 8 is an explanatory drawing, showing a condition of a recording medium insertion path closed by an open and close door of an open and close mechanism according to an embodiment of the invention;

FIG. 9 is an explanatory drawing, showing a condition of a recording medium insertion path opened by an open and close door of an open and close mechanism according to an embodiment of the invention;

DESCRIPTION OF THE PREFERRED EMBODIMENT

An open and close mechanism for a recording medium insertion path according to an embodiment of this invention will now be described with reference to FIG. 1–9. An open and close mechanism 1 for a recording medium insertion path is installed in a CD changer 2 as a record playback device shown in FIG. 1. The CD changer 2 may be mounted on a car as a vehicle.

The CD changer 2 receives a plurality of Compact Disks 3 (call CD after this) as recording medium and plays back the data recorded on the requested CD 3 according to order of a car driver in the car. The playback data are outputted as sounds with a speaker. The car driver can hear the recorded data on a requested CD 3 of a plurality of CDs 3 stored in the CD changer 2, by sounds.

Figure 1:
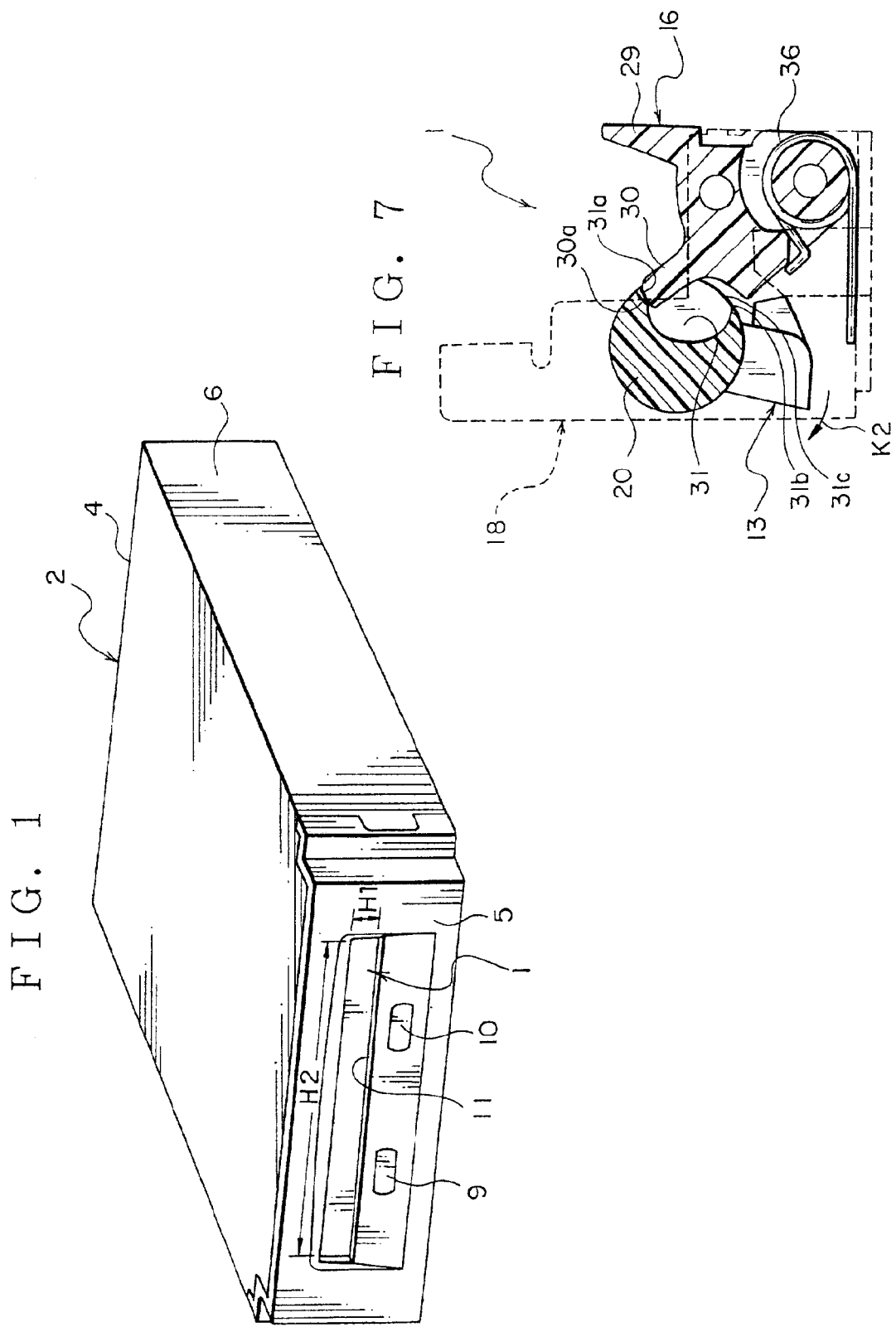
FIG. 1 is a perspective view of a CD changer having an open and close mechanism for a recording medium insertion path of an embodiment according to the invention.
Figure 2:
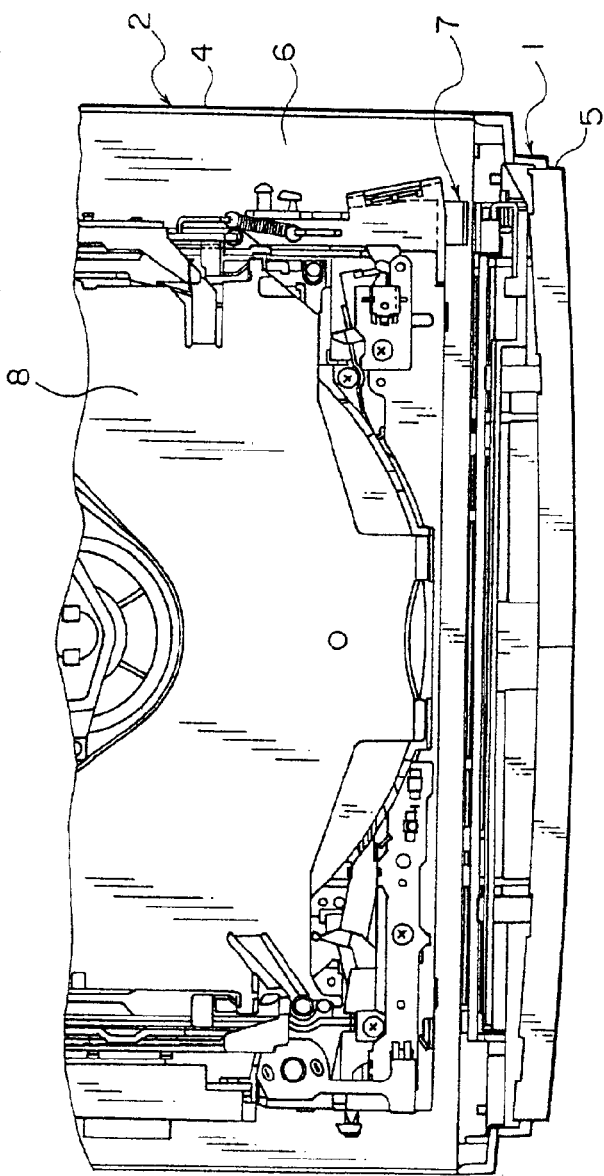
FIG. 2 is a plan view, showing a layout of a driving member of a CD changer shown in FIG. 1.

The CD changer 2, as shown in FIGS. 1 and 2, includes a mechanical body 4, a front panel 5 mounted on the mechanical body 4 and the open and close mechanism 1 for a recording medium insertion path (call simply "open and close mechanism") according to an embodiment of this invention. The mechanical body 4 is provided with a casing 6, various functional parts mounted in the casing 6 and a recording medium containing portion 8 provided in the casing 6. The casing 6 is formed into box shape.

Said functional parts are used for playing back data recorded on the CD 3. The recording medium containing portion 8 contains a plurality of CDs 3, received in the casing 6 i.e. the mechanical body 4 through a later-described recording medium insertion path 19.

The casing 6 is provided inside with a driving member 7 as a driving device for constituting the open and close mechanism 1. The driving member 7 is formed into band shape. The driving member 7, as shown in FIG. 2, is received in the casing 6 so as to make the length thereof along a direction for moving to or from the front panel 5. The driving member 7 is mounted in the casing 6 capably to move close to or away from the front panel 5.

The driving member 7 slides by driving force such as a not-shown motor mounted in the casing 6 to move close to or away from the front panel 5. When moving close to the front panel 5, the driving member 7 abuts both an operating portion 22 of a later-described door gear 15 and an operating portion 29 of a locking cam 16 in the open and close mechanism 1. The driving member 7 moves both operating portions 22, 29 to a direction for pushing out from the equipment body 6 inside. When moving away from the front panel 5, the driving member 7 moves away from the both operating portions 22, 29 not to abut the both operating portions 22, 29.

Herein, a direction for moving the driving member 7 away from the front panel 5 is defined as an inward direction toward the mechanical body 4 inside. A direction for the driving member 7 closing to the front panel 5 is defined as an outward direction toward the mechanical body 4 outside.

The front panel 5 is mounted on a front side which is near side of the casing 6 i.e. the mechanical body 4 in FIG. 1. The front panel 5 is formed into a rectangular shape when viewed from top. The front panel 5 is provided with exposed switches 9, 10 for receiving a CD 3 into the mechanical body 4 and containing a CD 3 in the recording medium containing portion 8 or for ejecting a CD 3, contained in the recording medium containing portion 8, to out of the mechanical body 4.

The front panel 5 is provided with a recording medium passing opening 11 communicating with a later-described recording medium insertion path 19 of the open and close mechanism 1. The recording medium passing opening 11 is formed going through the front panel 5 into a rectangular shape when viewed from top. The length of the recording medium passing opening 11 is along a direction of width of the CD changer 2.

The recording medium passing opening 11 is formed with a height H1 along a direction of height of the CD changer 2 larger than a thickness of the CD 3 and with a width H2 along a direction of width of the CD changer 2 larger than a diameter of the CD 3. The recording medium passing opening 11 is almost same size or slightly larger size than the later-described recording medium insertion path 19 of the open and close mechanism 1.

The front panel 5, attached on the equipment body 6 of the mechanical body 4, constitutes an outer shell of the CD changer 2. The front panel 5 forms an outer wall of the CD changer 2 i.e. a record playback device.

The open and close mechanism 1 is mounted on the front panel 5. The open and close mechanism 1 is attached on an inner surface of the front panel 5 close to the casing 6. The open and close mechanism 1, as shown in FIG. 3–6, is provided with the above-mentioned driving member 7, a frame 12, an open and close door 13, a door gear 15, a first torsion spring 14 as an energizing device, a locking cam 16 as a cam member and a second torsion spring 36.

Figure 3:
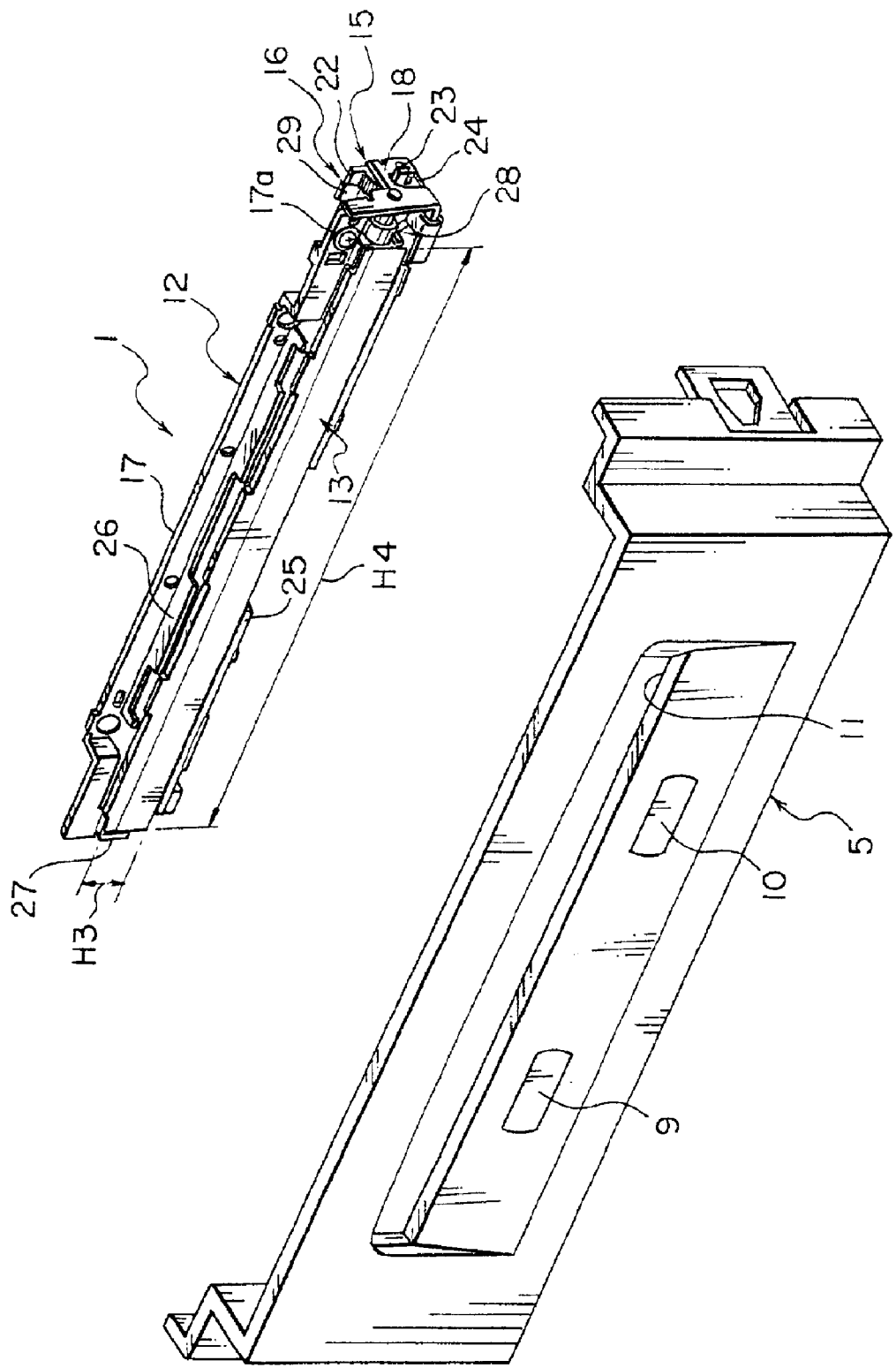
FIG. 3 is a perspective view, showing a front panel and recording medium insertion path of a CD changer shown in FIG. 1.
Figure 4:
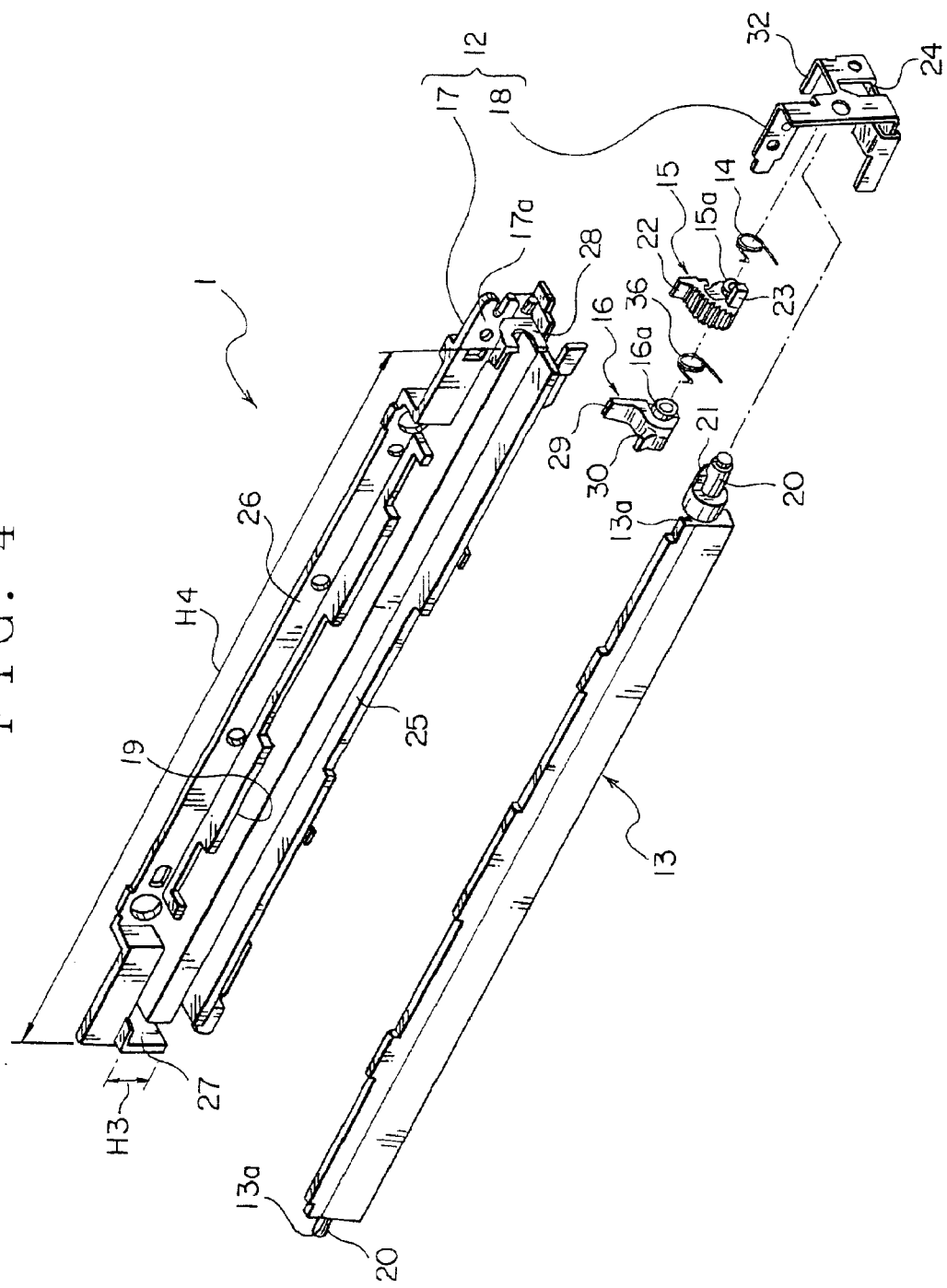
FIG. 4 is an exploded perspective view of the open and close mechanism shown in FIG. 3.
Figure 10:
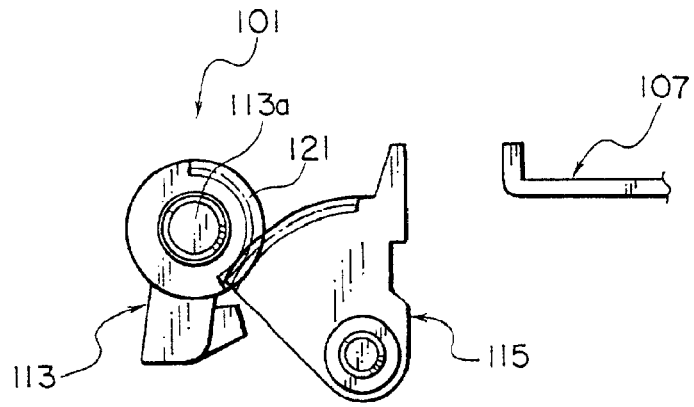
FIG. 10 is an explanatory drawing, showing a condition of closing an open and close door of an open and close mechanism by prior art.
Figure 11:
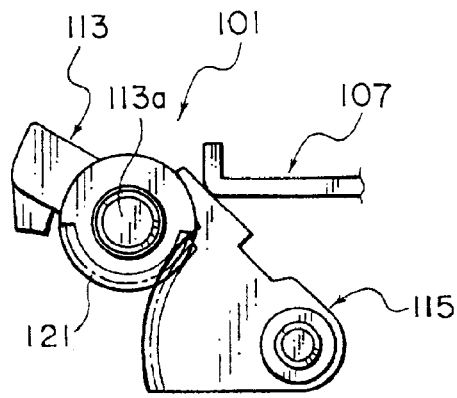
FIG. 11 is an explanatory drawing, showing a condition of path an open and close door of an open and close mechanism shown in FIG. 10.
Figure 12:
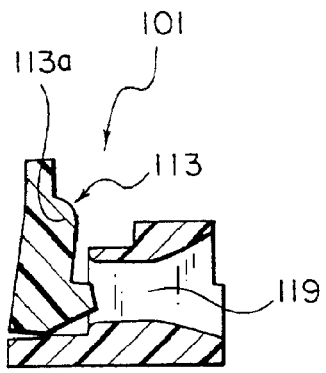
FIG. 12 is a sectional view, showing a condition of closing an open and close door of an open and close mechanism shown in FIG. 10.
Figure 13:
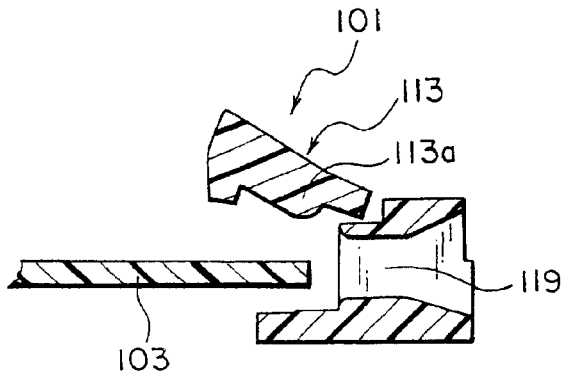
FIG. 13 is a sectional view, showing a condition of path an open and close door of an open and close mechanism shown in FIG. 10.

The frame 12 is formed with a frame-shape frame body 17 and a second frame 18, as shown in FIGS. 3 and 4. The frame body 17 is formed into frame-shape with beams 25, 26, 27 and 28. The beams 25, 26, 27 and 28 form marginal walls constituting the recording medium insertion path 19. An inner space enclosed with four beams 25, 26, 27 and 28 of the frame body 17 makes the recording medium insertion path 19.

The recording medium insertion path 19 is formed into a rectangular shape when viewed from top. The length of the recording medium insertion path 19 is along a direction of width of the CD changer 2. The recording medium insertion path 19 is formed with a height H3 along a direction of height of the CD changer 2 larger than a thickness of the CD 3 and with a width H4 along a direction of width of the CD changer 2 larger than a diameter of the CD 3.

The recording medium insertion path 19 is contiguous to the recording medium passing opening 11 when the open and close mechanism 1 is mounted on the front panel 5. Thus, the recording medium insertion path 19 is opened in the front panel 5. The recording medium insertion path 19 allows to insert a CD 3 into the mechanical body 4 inside. The recording medium passing opening 11 and the recording medium insertion path 19 constitutes a transporting path of a recording medium, described herein.

The second frame 18 is mounted on the frame body 17. The second frame 18 may be made of sheet metal and is mounted on an end portion 17a of the frame body 17 along a direction of height of the CD changer 2. Both the door gear 15 and the locking cam 16 are placed between the second frame 18 and the frame body 17. The second frame 18 is provided with a hole 24 and a stopper piece 32. The stopper piece 32 is provided at rear walls side of the door gear 15 and the locking cam 16 when viewed from the front panel 5.

Figure 5:
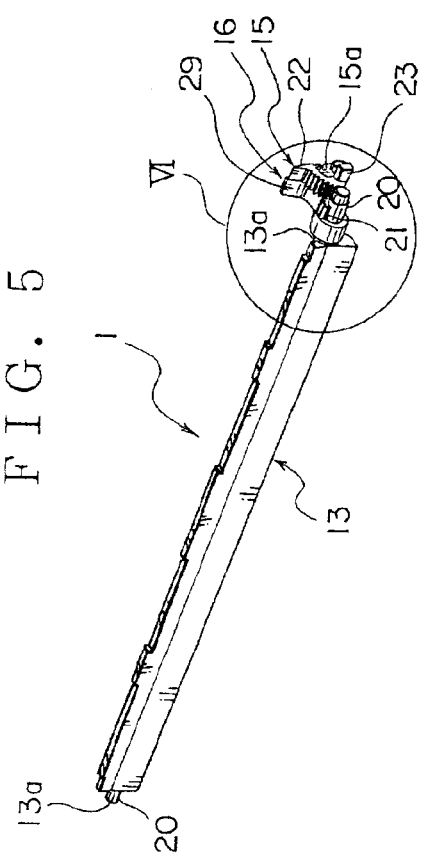
FIG. 5 is a perspective view, showing an open and close door and a door gear and locking cam assembled in the open and close mechanism shown in FIG. 3.

An open and close door 13 is formed into band shape with almost same size or slightly smaller size than the recording medium insertion path 19. The open and close door 13 is held in the recording medium insertion path 19 so as to make the length thereof along a width direction of the CD changer 2 i.e. the recording medium insertion path 19. The open and close door 13 is provided with a couple of pivot shafts 20 projecting from both end portions of the length, as shown in FIG. 4–6.

The respective pivot shaft 20 extends along a direction of width of the recording medium insertion path 19. The pivot shafts 20 are provided on the both end portions 13a in a direction of width of the open and close door 13 placed on one end portion in a direction of height of the recording medium insertion path 19. The end portions 13a are located at a top end of the open and close door 13 in a drawing of the embodiment. The end portions 13a form the end portion in a direction of height of the recording medium insertion path 19.

The open and close door 13 is bore by the frame body 17, capably to rotate about a center of an pivot shafts 20. Therefore, the open and close door 13, rotated about the center of the end portion 13a in direction of width, located upper side in drawings, opens or closes the recording medium insertion path 19.

The pivot shaft 20, near the end portion 17a, is formed integrally with a gear 21 and a concave portion 31 (shown in FIG. 7). The gear 21 is disposed coaxially with the pivot shaft 20. In other words, the gear 21 is disposed coaxially with a rotation center of the pivot 20 i.e. a rotation center of the open and close door 13.

The concave portion 31 is formed to be dent on the outer surface of the pivot shaft 20, as shown in FIG. 7. A open end 31c of the concave portion 31 corresponds to the locking cam 16 when the open and close door 13 closes the recording medium insertion path 19.

The door gear 15 is formed into fan shape. The door gear 15 is bore by the second frame 18, capably to rotate about a center of a top portion 15a thereof (shown in FIG. 4). The door gear 15 meshes with the gear 21. The rotating door gear 15 rotates the open and close door 13 about the center of the pivot shafts 20 to make the open and close door 13 open or close the recording medium insertion path. Thus, the door gear 15 rotates interlocking with open and close action for the recording medium insertion path 19 by the open and close door 13.

The door gear 15 is provided with the operating portion 22 moving away from the rotation center and projecting outwardly from an outer edge portion, and a stopper projection 23 located near the rotation center and projecting outwardly along a width direction of the CD changer 2. The operating portion 22 abuts on the driving member 7 moving toward the front panel 5 from the equipment body 6 inside of the mechanical body 4.

The stopper projection 23 projects outwardly from the second frame 18 along a width direction of the CD changer 2 through the hole 24 when the door gear 15 is bore by the second frame 18 capably to rotate. The stopper projection 23, inserted through the hole 24, can control a rotation limit of the door gear 15 to be located between positions of the open and close door 13 opening and closing the recording medium insertion path 19.

The first torsion spring 14, placed between the door gear 15 and the second frame 18, energizes the door gear 15 toward a direction for the open and close door 13 closing the recording medium insertion path 19. The door gear 15 abuts on the stopper piece 32 by energizing force of the first torsion spring 14 when the open and close door 13 close the recording medium insertion path 19. The door gear 15, rotated by the driving member 7 to a direction for the operating portion 22 moving toward the front panel 5, makes the open and close door 13 open the recording medium insertion path 19.

The open and close door 13, the door gear 15 and the first torsion spring 14 constitute the open and close device described above.

The locking cam 16 is formed into fan shape. The locking cam 16 is bore by the second frame 18 capably to rotate about a center of the top portion 16a (shown in FIG. 4). The rotation center of the locking cam 16 is disposed coaxially with the rotation center of the door gear 15.

The locking cam 16 is provided with the operating portion 29 moving away from the rotation center and projecting outwardly from an outer edge portion. The operating portion 29 abuts on the driving member 7 moving toward the front panel 5 from the equipment body 6 inside of the mechanical body 4.

The locking cam 16 is energized by the second torsion spring 36 to position the operating portion 29 and the operating portion 22 of the door gear 15 in the same angle position and toward a direction for abutting on the stopper piece 32. The locking cam 16 is energized by energizing force of the second torsion spring 36 to position the operating portion 29 and the operating portion 22 of the door gear 15 in the same angle position and to abut on the stopper piece 32 when the open and close door 13 closes the recording medium insertion path 19. Therefore, the operating portion 29 of the locking cam 16 and the operating portion 22 of the door gear 15 abut almost simultaneously on the driving member 7 moving close to the front panel 5.

The locking cam 16 is provided with a convex portion 30, as shown in FIG. 7. The convex portion 30 projects outwardly from an outer edge portion moving away from the rotation center of the locking cam 16. The convex portion 30, as shown in FIG. 7, goes into the concave portion 31 inside when the open and close door 13 closes the recording medium insertion path 19 and the locking cam 16 abuts on the stopper piece 32. Simultaneously, a top end surface 30a of the convex portion 30 is positioned to be opposite to an edge portion 31a of the concave portion 31.

If the open and close door 13 is tried to rotate about the center of the pivot shaft 20 toward a direction for opening the recording medium insertion path 19 in above condition, the top end surface 30a of the convex portion 30 abuts on the edge portion 31a, at a near side of the mechanical body 4, of the concave portion 31. Then, the convex portion 30 and the concave portion 31 prevent the open and close door 13 rotating to a direction for opening the recording medium insertion path 19. Therefore, the convex portion 30, the concave portion 31 and the locking cam 16 prevent the open and close door 13 rotating about the center of the pivot shaft 20 by the convex portion 30 going into the concave portion 31 when the open and close door 13 closes the recording medium insertion path 19.

In FIG. 7, the open and close door 13, the concave portion 31, the locking cam 16, the convex portion 30 and the second torsion spring 36 are shown with a solid line and the second frame 18 is shown with a dotted line.

If the open and close door 13 is tried to rotate to a direction for moving the operating portion 29 close to the front panel, the convex portion 30 is allowed to go out through the concave portion 31 inside from the edge portion 31b, at outer side of the mechanical body 4, of the concave portion 31. Therefore, the locking cam 16 rotates to a direction for getting the convex portion 30 out through the concave portion 31 from the edge portion 31b, when the locking cam 16 is pushed to a direction for moving the operating portion 29 close to the front panel 5.

The convex portion 30 of the locking cam 16 allows the pivot shaft 20 rotating when the locking cam 16 rotates to a direction for moving the operating portion 29 close to the front panel 5. Therefore, the locking cam 16 is allowed to rotate to a direction for making the open and close door 13 open the recording medium insertion path 19 when the locking cam 16 rotates to a direction for moving the operating portion 29 close to the front panel 5.

In other words, the convex portion 30 moves, interlocking with rotation of the door gear 15, in the concave portion 31 inside in a direction for going out from the concave portion 36 when the locking cam 16 rotating together with the door gear 15. Then, the convex portion 30, the concave portion 31 and the locking cam 16 allow the open and close door 13 rotating around the pivot shaft 20 when the locking cam 16 is rotated together with the door gear 15 by the driving member 7.

Thus, the convex portion 30, the concave portion 31 and the locking cam 16 lock open and close action of the open and close door 13 when the open and close door 13 closes the recording medium insertion path 19. And the convex portion 30, the concave portion 31 and the locking cam 16 unlock the open and close door 13 when the driving member 7 makes the open and close door 13 open the recording medium insertion path 19. The convex portion 30, the concave portion 31 and the locking cam 16 allow the open and close door 13 rotating around the pivot shaft 20 when the driving member 7 rotates the door gear 15.

The convex portion 30, the concave portion 31 and the locking cam 16 constitute the locking device described above.

The open and close mechanism 1, with above-mentioned structure, which is mounted on the front panel 5 assembled in the casing 6 of the mechanical body 4, constitutes a part of the CD changer 2. In the CD changer 2, the driving member 7 is received in a rear room of the casing 6 of the mechanical body 4, moved away from the front panel 5, except in conditions of inserting a CD 3 into the mechanical body 4 or ejecting a CD 3 from the mechanical body 4.

The driving member 7, as shown in FIG. 8, is away both from the operating portion 22 of the door gear 15 and the operating portion 29 of the locking cam 16. The open and close door 13 closes the recording medium insertion path 19 and the door gear 15 abuts on the stopper piece 32 by means of energizing force of the first torsion spring 14.

The operating portion 29 of the locking cam 16 is positioned in the same angle position of the operating portion 22 of the door gear 15 and the locking cam 16 abuts on the stopper piece 32 by energizing force. The convex portion 30 is in the concave portion 31 inside.

Thereafter, the driving member 7 moves slowly toward an outside of the mechanical body 4 when pushing the switch 9. The driving member 7 abuts both on the operating portions 22, 29. The driving member 7 pushes the operating portion 22 toward an outside of the mechanical body 4 in opposition to the energizing force by the first torsion spring 14. The driving member 7 pushes the operating portion 29 toward an outside of the front panel 5 i.e. the mechanical body 4 in opposition to the energizing force by the second torsion spring 36.

Then, the locking cam 16 rotates along an arrow K1 in FIG. 8 about the center of the top portion 16a and the convex portion 30 passes through the concave portion 31 inside toward the edge portion 31b close to the front panel 5. And the door gear 15 rotates along an arrow K1 in FIG. 8 about the center of the top portion 15a and the open and close door 13 rotates along an arrow K2 in FIG. 8 about the center of the pivot shaft 20. The convex portion 30 is going out from the concave portion 31 and the open and close door 13 opens gradually the recording medium insertion path 19.

When the driving member 7, as shown in FIG. 9, moves more toward the outside of the mechanical body 4, the convex portion 30 passes near the edge portion 31b and goes out from the concave portion 31. Then, the open and close door 13 opens the recording medium insertion path 19. Thus, the open and close door 13 opens the recording medium insertion path 19.

A CD 3 is inserted through the recording medium insertion path 19 into the mechanical body 4 to be contained in the recording medium containing portion 8 and ejected through the recording medium insertion path 19 from the recording medium containing portion 8. When pushing the switch 10, the driving member 7 moves gradually toward the inside of the mechanical body 4 and the open and close door 13 closes the recording medium insertion path 19 by means of the energizing force of the torsion springs 14, 36 and the convex portion 30 goes into the concave portion 31 from the edge portion 31b.

In FIGS. 8 and 9, the open and close door 13, the concave portion 31, the locking cam 16, the convex portion 30 and the driving member 7 are shown with solid line, and the gear 21 and the door gear 15 are shown with two-dot chain line, and the stopper piece 32 of the second frame 18 is shown with dotted line, and the beam 25 is shown with long dashed short dashed line. In FIG. 9, a CD 3 is shown with long dashed short dashed line.

According to this embodiment of the invention, the convex portion 30 of the locking cam 16 is in the concave portion 31 formed on an outer surface of the pivot shaft 20 when the open and close door 13 closes the recording medium insertion path 19. Therefore, when trying to open the open and close door 13 along the arrow K2 in FIG. 7, the top end surface 30a of the convex portion 30 and an edge portion 31a abut on each other. Then, a force for opening is transmitted through the top end surface 30a to the edge portion 31a and received. Thus, rotating the pivot shaft 20 for opening the open and close door 13 is not allowed.

Thus, when the open and close door 13 closes the recording medium insertion path 19, the convex portion 30 and the concave portion 31 prevent to open the open and close door 13. Therefore, the recording medium insertion path 19 is kept closed except in a condition of the driving member 7 opening the open and close door 13.

Then, the open and close door 13 can not be opened, except in conditions of receiving a CD 3 into the CD changer 2 or ejecting a CD 3 from the CD changer 2. Therefore, in a disabled condition of the CD changer 2 receiving a CD 3, inserting a CD 3 into the mechanical body 4 is prevented. In short, miss-inserting a CD 3 can be prevented.

Furthermore, when the driving member 7 moves toward an outside of the mechanical body 4 and pushes the operating portions 22, 29 toward an outside of the mechanical body 4, the convex portion 30 is going out through the concave portion 31 inside. The locking cam 16 rotates about the center of the top portion 16a. Thus, when the driving member 7 moves toward an outside of the mechanical body 4 and pushes the operating portions 22, 29 toward an outside of the mechanical body 4, the open and close door 13 rotates about the center of the pivot shaft 20 and opens the recording medium insertion path 19.

Thus, when the CD changer 2 is in enabled conditions of inserting a CD 3 into the CD changer 2 and ejecting a CD 3 from the CD changer 2 by the driving member 7 moving toward an outside of the mechanical body 4, the open and close door 13 opens the recording medium insertion path 19 securely. Also, when the CD changer 2 is in enabled conditions of inserting a CD 3 into the CD changer 2 and ejecting a CD 3 from the CD changer 2, inserting and ejecting a CD 3 can be done securely.

In the embodiment of the invention mentioned above, the CD changer 2 is shown as a record playback device. The invention can be not only applied on the CD changer, but also other various record playback devices such as a CD player, a CD-ROM drive device for a navigation device.

What is claimed is:

1. An open and close mechanism for inserting a recording medium into a medium container, comprising:
   a recording medium insertion path allowable to pass the recording medium therethrough;

an open and close device for opening and closing the recording medium insertion path;

a driving device for operating said open and close device to open the recording medium insertion path; and a locking device for locking an open and close operation of the open and close device, whether or not the recording medium is provided in the medium container, when the open and close device closes the recording medium insertion path, and maintains a condition of locking the open and close operation when an external force, other than an opening force provided by the driving device, acts on the open and close device.

wherein said locking device releases a locking condition of the open and close device when the driving device operates the open and close device to open the recording medium insertion path.

2. An open and close mechanism for a recording medium insertion path, for inserting a recording medium into a mechanical body of a record playback device and ejecting the same therefrom, comprising:

a recording medium insertion path allowable to pass the recording medium therethrough;

an open and close device for opening and closing the recording medium insertion path;

a locking device for locking an open and close operation of the open and close device, whether or not the recording medium is provided in the mechanical body, when the open and close device closes the recording medium insertion path; and a driving device for operating said open and close device to open the recording medium insertion path, and the driving device installed in the mechanical body, wherein said locking device releases a locking condition of the open and close device when the driving device operates the open and close device to open the recording medium insertion path, wherein the locking device maintains a condition of locking the open and close operation when an external force, other than an opening force provided by the driving device, acts on the open and close device, and wherein said open and close device comprises:

an open and close door provided rotatably about a center of a pivot shaft extending along a direction of width of the recording medium insertion path and rotating about the center of said pivot shaft for opening and closing the recording medium insertion path;

a door gear rotating together with the open and close door operation of opening and closing the recording medium insertion path; and an energizing device for energizing the door gear for closing the open and close door of the recording medium insertion path, wherein the door gear is rotated by the driving device for opening the open and close door of the recording medium insertion path, wherein the locking device locks the open and close door rotating about the center of the pivot shaft when closing the recording medium insertion path and allows the open and close door rotating about the center of the pivot shaft when the driving device rotating the door gear.

3. An open and close mechanism for a recording medium insertion path, for inserting a recording medium into a mechanical body of a record playback device and ejecting the same therefrom, comprising:

a recording medium insertion path allowable to pass the recording medium therethrough;

an open and close device for opening and closing the recording medium insertion path;

a locking device for locking open and close operation of the open and close device when the open and close device closes the recording medium insertion path; and a driving device for operating said open and close device to open the recording medium insertion path, and the driving device installed in the mechanical body, wherein said locking device releases a locking condition of the open and close device when the driving device operates the open and close device to open the recording medium insertion path, wherein said open and close device comprises:

an open and close door provided rotatably about a center of a pivot shaft extending along a direction of width of the recording medium insertion path and rotating about the center of said pivot shaft for opening and closing the recording medium insertion path;

a door gear rotating together with the open and close door operation of opening and closing the recording medium insertion path; and an energizing device for energizing the door gear for closing the open and close door of the recording medium insertion path, wherein the door gear is rotated by the driving device for opening the open and close door of the recording medium insertion path, wherein the locking device locks the open and close door rotating about the center of the pivot shaft when closing the recording medium insertion path and allows the open and close door rotating about the center of the pivot shaft when the driving device rotating the door gear, wherein said locking device comprises:

a cam member being rotated together with the door gear by the driving device when the driving device rotates the door gear;

a convex portion projecting toward the pivot shaft from the cam member; and a concave portion formed concavely on an outer surface of the pivot shaft, wherein the convex portion goes into the concave portion to lock the open and close door rotating about the center of the pivot shaft when the open and close door closing the recording medium insertion path, wherein the cam member rotates together with the door gear for moving the convex portion in the concave portion and getting the same out the concave portion to allow the open and close door rotating about the center of the pivot shaft when the door gear is rotated by the driving device.

4. An apparatus, comprising:

a door that opens and closes an insertion path of a recording medium;

a lock that secures the door when the door is in a closed position; and a gear that rotates when the door opens or closes, wherein the lock comprises a cam that rotates with the gear when the gear is driven to rotate.

5. The open and close mechanism according to claim 4, wherein the lock further composes a convex projection that projects from the cam member and that serves to lock the door when the door is in the closed position.

6. The open and close mechanism according to claim 4, wherein a motor energizes the gear for closing the door.

7. An apparatus, comprising:

a door that opens and closes an insertion path of a recording medium;

a lock that secures the door when the door is in a closed position, wherein the lock is released when the door is moved to an open position, wherein the lock does not exert a driving force to move the door to the open position or the closed position.

8. The apparatus according to claim 7 wherein the door opens and closes the insertion path of the recording medium via a driving device, wherein the lock secures the door in the closed position whether or not the recording medium is provided in the apparatus, and wherein the lock maintains a secured condition when an external force, other than a driving force of the driving device, acts on the door.

* * * * *

UNITED STATES PATENT AND TRADEMARK OFFICE
CERTIFICATE OF CORRECTION

PATENT NO. : 6,931,649 B2
DATED : August 16, 2005
INVENTOR(S) : Koji Sugita and Masakaz Sawahata It is certified that error appears in the above-identified patent and that said Letters Patent is hereby corrected as shown below:

<u>Column 11,</u>
Line 12, please delete "." and insert -- , --.

Signed and Sealed this

Twenty-second Day of November, 2005

JON W. DUDAS
*Director of the United States Patent and Trademark Office*